(12) United States Patent
Markley et al.

(10) Patent No.: US 7,568,195 B2
(45) Date of Patent: Jul. 28, 2009

(54) DETERMINING A MAXIMAL SET OF DEPENDENT SOFTWARE UPDATES VALID FOR INSTALLATION

(75) Inventors: Michael E. Markley, Redmond, WA (US); Scott R. Shell, Kirkland, WA (US); Jeffrey D. Glaum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 10/837,176

(22) Filed: May 1, 2004

(65) Prior Publication Data

US 2005/0132350 A1     Jun. 16, 2005

Related U.S. Application Data

(60) Provisional application No. 60/530,130, filed on Dec. 16, 2003.

(51) Int. Cl.
*G06F 9/44* (2006.01)
*G06F 9/445* (2006.01)

(52) U.S. Cl. .......... 717/175; 717/170
(58) Field of Classification Search .......... 717/175, 717/170
See application file for complete search history.

(56) References Cited

U.S. PATENT DOCUMENTS

| | | | |
|---|---|---|---|
| 4,974,149 A | 11/1990 | Valenti | |
| 5,303,384 A | 4/1994 | Rodriguez | |
| 5,421,006 A | 5/1995 | Jablon | |
| 5,625,693 A | 4/1997 | Rohatgi | |
| 5,757,914 A | 5/1998 | McManis | |
| 5,835,777 A | 11/1998 | Staelin | |
| 6,157,721 A | 12/2000 | Shear | |
| 6,243,468 B1 | 6/2001 | Pearce | |
| 6,327,652 B1 | 12/2001 | England | |

(Continued)

FOREIGN PATENT DOCUMENTS

EP     0802480     10/1997

(Continued)

OTHER PUBLICATIONS

Ottenstein et al., "The Program Dependence Graph In a Software Development Environment", ACM 1984 p. 177-184.*

(Continued)

*Primary Examiner*—Tuan Q Dam
*Assistant Examiner*—Zheng Wei
(74) *Attorney, Agent, or Firm*—Workman Nydegger (57) ABSTRACT

Described is a system and method by which a collection of software packages for installing (e.g., on an embedded computing device) are reviewed for their dependent relations, whereby it is possible to choose a maximal set of install possibilities to allow for maximal version updates for any given package in the fewest update steps possible, while honoring package dependency constraints. An update validation process organizes and validates update packages that have been downloaded to a device, and builds a graph for each group. The graph data including paths between updates are processed to validate the updates and to determine a minimal and optimal set of packages that can be applied to the existing image on the device to produce the desired update, with the least amount of weight (cost) when more than one path can be used to get to the same version.

15 Claims, 10 Drawing Sheets

U.S. PATENT DOCUMENTS

| | | |
|---|---|---|
| 6,330,670 B1 | 12/2001 | England |
| 6,381,742 B2 | 4/2002 | Forbes |
| 6,483,746 B2 | 11/2002 | Haraguchi |
| 6,675,382 B1 | 1/2004 | Foster |
| 6,681,390 B2 | 1/2004 | Fiske |
| 6,697,948 B1 | 2/2004 | Rabin |
| 6,725,205 B1 | 4/2004 | Weller |
| 6,802,006 B1 | 10/2004 | Brodov |
| 6,807,665 B2 | 10/2004 | Evans |
| 6,820,130 B1 | 11/2004 | Miyamoto |
| 6,832,373 B2 * | 12/2004 | O'Neill ............... 717/171 |
| 6,871,344 B2 | 3/2005 | Grier |
| 6,912,591 B2 | 6/2005 | Lash |
| 7,000,230 B1 | 2/2006 | Murray |
| 7,007,049 B2 | 2/2006 | Peng |
| 7,072,807 B2 | 7/2006 | Brown |
| 7,085,957 B2 | 8/2006 | Sundareson |
| 7,117,304 B2 | 10/2006 | Sohn |
| 7,222,341 B2 * | 5/2007 | Forbes et al. ............ 717/170 |
| 7,228,541 B2 * | 6/2007 | Gupton et al. ........... 717/175 |
| 7,237,122 B2 | 6/2007 | Kadam |
| 7,249,174 B2 * | 7/2007 | Srinivasa et al. ........ 709/223 |
| 7,263,699 B2 | 8/2007 | Jacquemot |
| 7,346,435 B2 | 3/2008 | Amendola |
| 2001/0029605 A1 | 10/2001 | Forbes |
| 2001/0044782 A1 | 11/2001 | Hughes |
| 2002/0144248 A1 * | 10/2002 | Forbes et al. ............ 717/167 |
| 2002/0152394 A1 | 10/2002 | Kadoya |
| 2003/0028766 A1 | 2/2003 | Gass |
| 2003/0046482 A1 | 3/2003 | Venkiteswaran |
| 2003/0063896 A1 | 4/2003 | Gonzales-Tover |
| 2003/0182563 A1 | 9/2003 | Liu |
| 2003/0217358 A1 | 11/2003 | Thurston |
| 2004/0003266 A1 | 1/2004 | Moshir |
| 2004/0015946 A1 * | 1/2004 | Te'eni et al. ............. 717/169 |
| 2004/0015958 A1 | 1/2004 | Veil |
| 2004/0060035 A1 | 3/2004 | Ustaris |
| 2004/0250245 A1 | 12/2004 | Rao |
| 2004/0255291 A1 | 12/2004 | Sierer |
| 2005/0132123 A1 | 6/2005 | Glaum |
| 2005/0132179 A1 | 6/2005 | Glaum |
| 2005/0132349 A1 | 6/2005 | Roberts |
| 2005/0132356 A1 | 6/2005 | Cross |
| 2005/0155031 A1 | 7/2005 | Wang |
| 2005/0203968 A1 | 9/2005 | Dehghan |
| 2006/0079254 A1 | 4/2006 | Hogan |

FOREIGN PATENT DOCUMENTS

| | | |
|---|---|---|
| EP | 1164475 | 12/2001 |
| WO | WO99/26123 | 5/1999 |
| WO | WO0201332 | 1/2002 |
| WO | WO02103495 | 12/2002 |

OTHER PUBLICATIONS

Mark Allen Weiss, "Data Structures & Algorithm Analysis In C++" Second Edition, published by Addison Wesley, 1999, pp. 339-346, section 9.3.2 Dijkstra's Algorithm.*

Anonymous: "Method for Generating Ordered Build Dependencies" IBM Technical Disclosure Bulletin, vol. 38, No. 9, Sep. 1, 1995, p. 161.

U.S. Appl. No. 10/837,151, filed May 1, 2004, Shell.

Office Action dated Nov. 28, 2007 cited in related U.S. Appl. No. 10/837,024.

Office Action dated Jun. 29, 2007 cited in related U.S. Appl. No. 10/387,250.

Notice of Allowance dated Apr. 18, 2008 cited in related U.S. Appl. No. 10/837,024.

Office Action dated Dec. 12, 2007 cited in related U.S. Appl. No. 10/837,250.

Advisory Action dated Mar. 3, 2008 cited in related U.S. Appl. No. 10/837,250.

Office Action dated May 21, 2008 cited in related U.S. Appl. No. 10/837,250.

Office Action dated Nov. 23, 2007 cited in related U.S. Appl. No. 10/837,150.

Office Action dated Jun. 25, 2007 cited in related U.S. Appl. No. 10/837,024.

Office Action dated Aug. 21, 2006 cited in related U.S. Appl. No. 10/837,250.

Office Action dated Jun. 23, 2006 cited in related U.S. Appl. No. 10/837,151.

Office Action dated Aug. 25, 2008 cited in U.S. Appl. No. 10/837,150.

Office Action dated Dec. 9, 2008 cited in U.S. Appl. No. 10/837,151.

Office Action dated Jan. 7, 2009 cited in U.S. Appl. No. 10/837,250.

European Search Report in application EP 04029342 which corresponds to U.S. Appl. issued: Jun. 28, 2005.

Lynn, Brett; "Preventing the Unauthorised Binary" article, Copyright 2000-2002, Jan. 19, 2000 Updated Jun. 18, 2002 by Jay Fink.

* cited by examiner

DETERMINING A MAXIMAL SET OF DEPENDENT SOFTWARE UPDATES VALID FOR INSTALLATION

CROSS-REFERENCE TO RELATED APPLICATIONS

The present invention claims priority to U.S. provisional patent application Ser. No. 60/530,130 filed Dec. 16, 2003, and incorporated herein in its entirety.

The present invention is related to the following United States patent applications, filed concurrently herewith and incorporated herein in their entireties:

Ser. No.: 10/837,250, filed May 1, 2007, entitled "Applying Custom Software Image Updates To Non-Volatile Storage in a Failsafe Manner;"

Ser. No.: 10/837,151, filed May 1, 2004, entitled "Ensuring that a Software Update may be Installed or Run only on a Specific Device or Class of Devices;"

Ser. No.: 10/837,024, filed May 1, 2004, entitled "Self-Describing Software Image Update Components" and Ser. No.: 10/837,150, filed May 1, 2004, entitled "Creating File Systems Within a File In a Storage Technology-Abstracted Manner."

FIELD OF THE INVENTION

The invention relates generally to computing devices such as those having embedded operating systems, and more particularly to updating the non-volatile storage of computing devices.

BACKGROUND

Mobile computing devices such as personal digital assistants, contemporary mobile telephones, and hand-held and pocket-sized computers are becoming important and popular user tools. In general, they have become small enough to be extremely convenient, while consuming less battery power, and at the same time have become capable of running more powerful applications.

During the process of manufacturing such devices, embedded operating system images are typically built into a monolithic image file and stored in non-volatile storage (e.g., NAND or NOR flash memory, a hard disk and so forth) of each device. As a result, updating such a device is necessary or desirable from time-to-time.

However, a monolithic operating system has a number of disadvantages, including that to install an update, a large amount of resources (e.g., temporary storage and bandwidth) are needed to replace the entire monolithic image. At the same time, installing some subset components of the operating system is a difficult task, because the existing package install state on the device is variable, and there may be any number of versioned packages queued for install. At present there is not a known intelligent image update server infrastructure that can query the installed image on a device to figure out what to install. Even if such a server infrastructure can be developed, however, there would be privacy concerns with sharing a device's install state information with a server. What is needed is an efficient way to handle device updates on the device side, that can deal with the many update versions and conflicts and dependencies between those versions.

SUMMARY OF THE INVENTION

Briefly, the present invention is directed towards a system and method by which a collection of packages for installing (e.g., on an embedded device) are reviewed for their dependent relationships, whereby it is possible to choose a maximal set of install possibilities to allow for maximal version updates for any given package in the fewest update steps possible, while honoring package dependency constraints. This is accomplished by knowing both the existing package install state on the device as well as the versioned packages queued for installation.

Any package to be installed is first validated, which refers to a process in which the packages queued for install are reviewed for completeness, the contents are validated, update authority is determined (from a signature mechanism), and dependency relationships are determined. In one implementation, the result of the validation process comprises two lists: a list of packages that can be installed because they pass the validation requirements, and a list of packages which cannot because they fail to meet one or more of the validation requirements, along with a failure reason. The lists may be sorted into an installation order.

An update validator/validation process is provided, which in general organizes and validates a set of update packages that have been downloaded to a device into groups that are based on the target package being updated. Each group is processed to determine a minimal and optimal set of packages that can be applied to the existing image on the device to produce the update. To determine the minimal and optimal set of packages, the packages are organized into a graph that may have multiple paths from the base node (representing the target package) to each of the leaf nodes. The graph facilitates determining an optimal path through the set of packages, whereby the existing device package may be updated to the highest possible version of each package specified within the update set with the lowest cost (weighted) update. To this end, after the graphs are built, they are walked for various validation purposes, while attempting to find the highest version that the device can be update to, with the least amount of weight (cost) when more than one path can be used to get to the same version.

In one implementation, the validation process is accessible as an application programming interface called, for example, by an update application. The validation process looks for a device manifest file for each package (the device manifest file describes the package), and when found, the package is added (e.g., as a representative node for that package) to the package graph. When each the manifest files have been processed, graph processing looks for certificate information, including checking the parent node's certificate chain and pruning any corresponding branch from the tree from the parent node when not valid. When the branches and nodes of the graph have been processed including for signature verification, the lowest weighted branch is determined, and that branch is added to the update list that is to be returned to the calling entity.

Other advantages will become apparent from the following detailed description when taken in conjunction with the drawings, in which:

DETAILED DESCRIPTION

Exemplary Operating Environment

Figure 1:
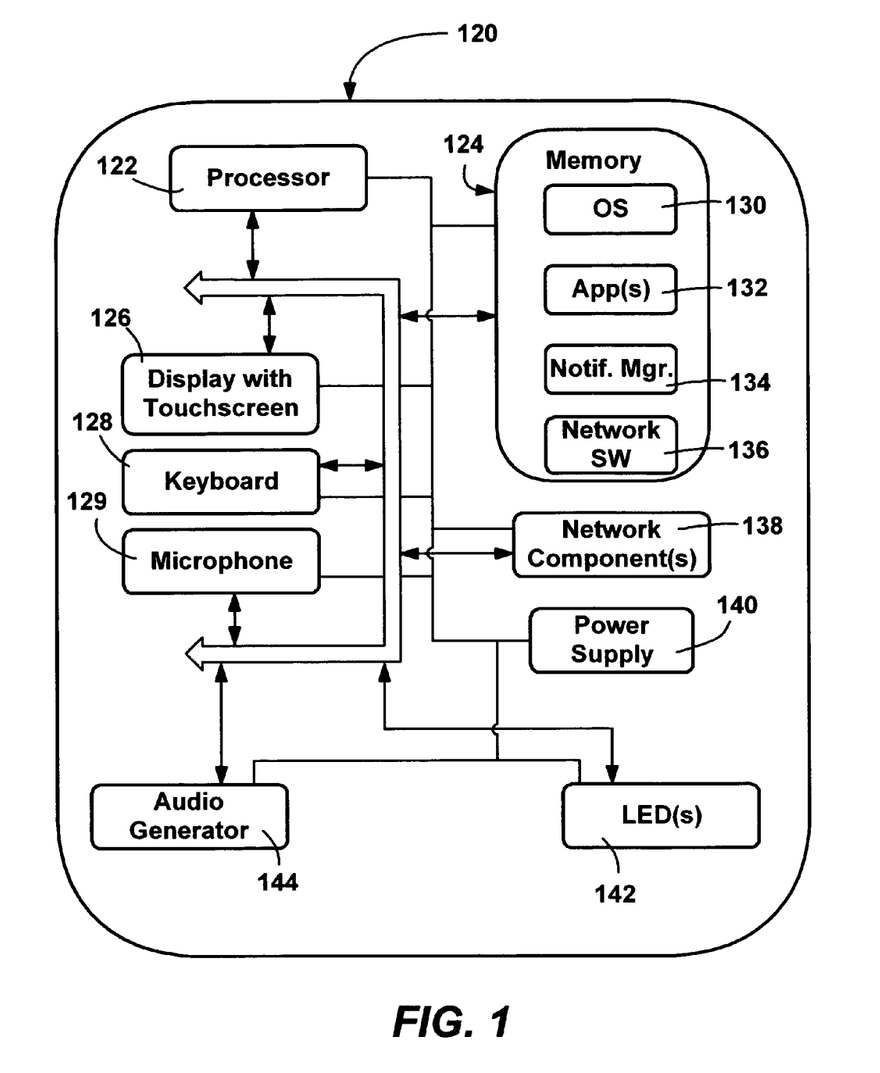
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). A microphone 129 may be present to receive audio input. The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Note that although a basic handheld personal computer has been shown, virtually any device capable of receiving data communications and processing the data in some way for use by a program, such as a mobile telephone, is equivalent for purposes of implementing the present invention.

Determining Software Updates Valid for Installation

The present invention is generally directed towards updating software that is stored on small mobile computing devices, such as Microsoft Windows® CE .NET-based portable devices, including those in which the initial software or software update is written to the embedded device's non-volatile memory, e.g., flash memory. Notwithstanding, the present invention provides benefits to computing in general, and thus may apply to other computing devices and other types of storage, including various types of memory and/or other types of storage media such as hard disk drives. For purposes of simplicity, the term "flash" hereinafter will be used with reference to the updatable storage of a device, although it is understood that any storage mechanism is equivalent. Further, the term "image" will generally include the concept of the initial software installation image as well as subsequent software updates to an image, even when only part of an existing image is updated.

In accordance with an aspect of the present invention, an appropriate subset of available software updates in the form of self-contained, secure entities is applied to an embedded device's non-volatile storage in an efficient, intelligent (and failsafe) manner. Various types of software updates may be applied, including full replacement updates and updates that may contain only the changes to a previous update. These software updates may contain both executable code and data, with the executable code customized to the virtual address space environment of the embedded device at install time.

Unlike monolithic updates, once the initial manufacturing image is installed on a device, updates to the image may be performed by updating discrete parts of the image via the present invention. In one implementation, these discrete parts are encapsulated into packages, wherein a package is a self-describing collection of image files (code, data, scripts and so forth), and may comprise a collection of components that is signed and packaged for distribution. In this implementation, the entire operating system image is built from one or more packages, each of which may be updated individually or in combination with other packages, depending upon each package's requirements.

Packages may be configured in various ways, including "canonical," "delta/difference," and "super" forms, that each serves various purposes with respect to software updates. For example, canonical packages contain a complete copy of each file within the package, while delta/difference packages contain one or more files which contain only the binary differences based on an earlier revision of the file. Delta/difference packages are applied to a previous version that is already installed, and are thus typically smaller in size relative to other packages and used when trying to reduce download cost and download time. Super packages contain other packages, and are used as a convenience when it is needed to download more than one package, such as when updating interdependent packages.

Canonical packages are generated during a build process by associating operating system features and metadata (e.g., a specific application's executable code and the associated data and configuration information) with a package definition. Delta/difference packages are generated from canonical packages by applying a binary difference algorithm to the contents of two canonical packages and, in keeping with the present invention as described below, capturing the dependent relationship that the delta/difference package has on the baseline canonical package version.

In accordance with an aspect of the present invention, there is provided an update validator/validation process that organizes and validates a set of update packages that have been downloaded to a device. A first step in this process organizes the packages into coherent groups based on the target package being updated. After the packages have been organized into groups, each group is processed to determine the minimal and optimal set of packages that can be applied to the existing image on the device to produce the update. The coherent groups each comprise a set of packages that target the same existing package on the device. Each of the new packages may have a different base version and be applicable to a different target version.

To determine the minimal and optimal set of packages, the packages are organized into a graph that may have multiple paths from the base node (representing the target package) to each of the leaf nodes. This facilitates determining an optimal path through the set of packages that comprise the graph. Each group is processed to determine the optimal set of packages within the group to install, whereby the existing device package is updated to the highest possible version of each package specified within the update set.

A variety of factors affect the outcome of this processing. For example, if a dependency or signature cannot be validated, then that branch of the update is removed from the graph, and a different branch attempted, if one is available. One branch may be more efficient than another with respect to how much data needs to be updated; note that a canonical package is considered to have an infinite weight, because any way to obtain the update without using the canonical package (that is, via at least some deltas, possibly in multiple packages) is likely more efficient than writing (e.g., flashing) each file in the canonical package. Alternatively, it is feasible to have an actual weight for a canonical package.

Thus, a graph is built for each package, whether in an NK (kernel) partition or a system partition, wherein partitions are essentially different file systems, which may have different properties, where package contents may be stored, as generally described in the aforementioned related patent application entitled "Creating File Systems Within a File In a Storage Technology-Abstracted Manner." Note that the packages having contents that go into the NK partition are the same kind of packages as the packages which their contents go into the IMGFS partition. However, loading/booting sequence of the operating system is different for NK and system updates to the IMGFS partition, in that the NK partition is loaded first, and the drivers in the NK partition are used to locate and load the IMGFS partition files.

A node for each update package is added to the corresponding graph for that package. Version dependency relationships spelled out in the package manifests are then used to connect the nodes in the graph, e.g., version two of a package may upgrade version one of a package, and version three may upgrade version two (but not version one), whereby there would be an edge connection between version one and two and version two and three, but not between version one and three. It should be understood that the above version relationships only an example, and the relationships actually depend on the way the update is built. For example, it is possible to build a version 3 package that updates from a version 1 package. In general, each update package has a specific source version and a specific destination (final) version, and can only update from that source version, (which is not necessarily the destination version minus one). Note that a canonical update package can update any earlier version.

After the graphs are built, they are walked for various validation purposes, e.g., to check signatures as described below. In general, the graph walking process traverses the path in each graph, attempting to find the highest version that the device can be updated to, with the least amount of weight (cost) when more than one path can be used to get to the same version. While walking, if a node is not validated, that node and its path are essentially removed from the graph.

Figure 2:
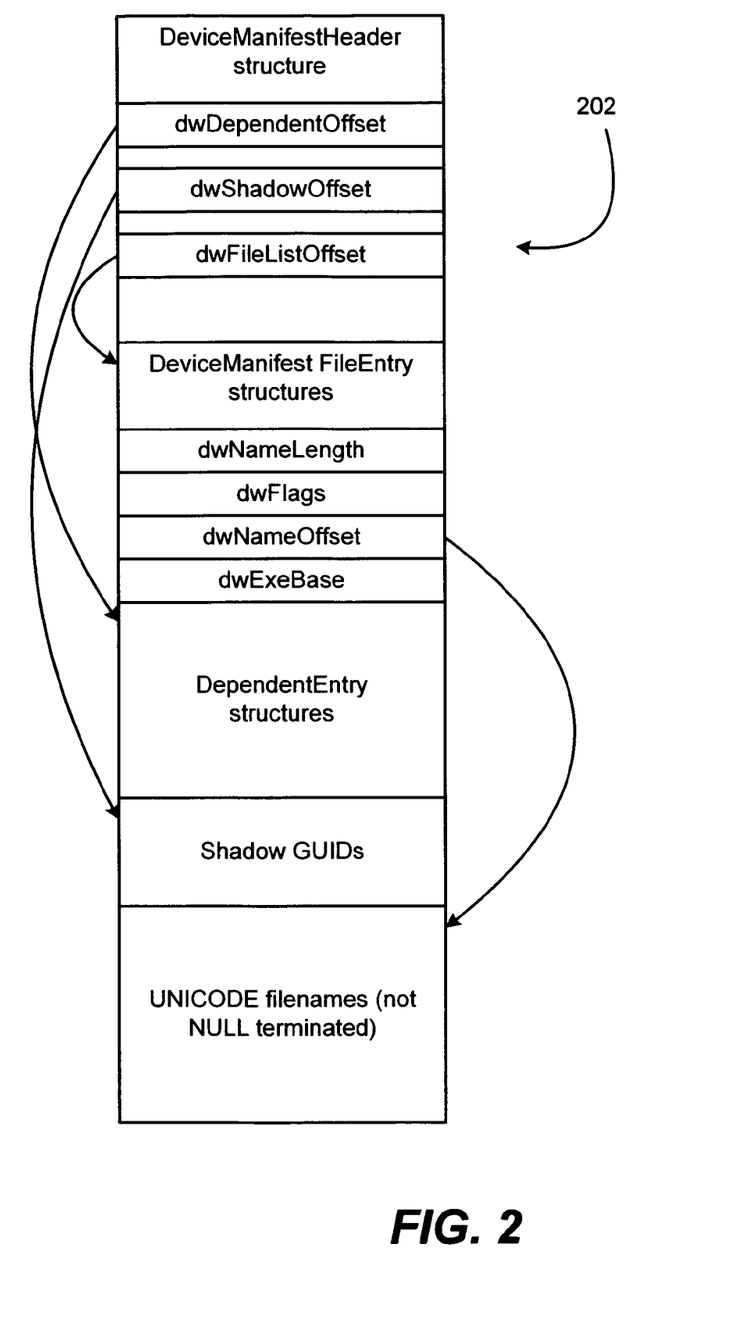
FIG. 2 is a representation of a manifest file used to obtain package dependency information in accordance with an aspect of the present invention.

With respect to package manifests, as described in the aforementioned related patent application entitled "Self-Describing Software Image Update Components," each package type contains a device-side manifest file (e.g., having a .dsm extension) that fully describes both the contents of the package as well as more general package characteristics (including dependency information). FIG. 2 represents a layout of the manifest file.

As seen in the table below, the device manifest header contains a globally-unique identifier (GUID) which uniquely refers to the lineage of that specific package and a version which refers to the specific package file:

```
typedef struct __DeviceManifestHeader
{
    const DWORD dwStructSize;         // Size of this structure (in bytes)
                                      // for versioning
    const DWORD dwPackageVersion;     // Version of this package
    const DWORD dwPrevPkgVersion;     // Version of package that this package
                                      // updates. (0) for Canonical
    const DWORD dwPackageFlags;       // package specific identifiers.
    const DWORD dwProcessorID;        // what processor (matches defines in
                                      // winnt.h)
    const DWORD dwOSVersion;          // what version of the operating system
                                      // was this built to.
    const DWORD dwPlatformID;         // what was the target platform.
    const DWORD dwNameLength;         // length of filename in bytes.
    const DWORD dwNameOffset;         // offset to Friendly name of package
    const DWORD dwDependentCount;     // How many entries in Dependent GUID
                                      // list.
    const DWORD dwDependentOffset;    // How many bytes from the front of the
                                      // file are the dependent GUID structs.
    const DWORD dwShadowCount;        // How many entries in shadow GUID list.
    const DWORD dwShadowOffset;       // How many bytes from front of file is
                                      // the array of shadowed package GUIDs.
```

```
            -continued
    const DWORD dwFileCount;        // How many files are there listed in
                                    // this manifest.
    const DWORD dwFileListOffset;   // How many bytes from the front of file
                                    // to the first FileEntry.
    const DWORD cbCERTData;         // number of bytes of digital certificate
                                    // data
    const DWORD dwCERTDataOffset;   // How many bytes from the front of file
                                    // to the certificate data.
    const GUID guidPackage;         // GUID of this package
}DeviceManifestHeader, *PDeviceManifestHeader;
typedef struct _DependentEntry {
    const DWORD size;
    const DWORD version;
    const GUID guid;
}DependentEntry,*PDependentEntry;
typedef struct _FileEntry {
    const DWORD dwNameLength;
    const DWORD dwFlags;
    const DWORD dwOffset;
    const DWORD dwBase; // Base address that file was originally linked with.
    const DWORD dwFileSize;         // Size of the whole file. Not accurate for
                                    // update packages.
}FILEENTRY,*PFILEENTRY;
```

Also seen in the device manifest header is a list of packages on which the current package is dependent, each described by the following structure:

```
    typedef struct _DependentEntry {
        const DWORD size;
        const DWORD version;
        const GUID guid;
    }DependentEntry,*PDependentEntry;
```

There can be any number of packages each uniquely described by a GUID; all versions of a package share the same GUID. The dependency rules for a package require that the package or packages on which a package is dependent are either at or above the version number identified in the dependency list. A package is at or above the specified version if such a version is already installed on the device, or the install is pending and its dependencies are satisfied (thus ensuring its install).

To provide access to the information in the device side manifest file, which in one implementation is a binary file with a proprietary format, a common Package Information API (PackageInfoAPI) is provided. The present invention uses the package information API to determine the existing install state for a package on the device, as well as for packages that are queued for possible install. The API exists as a build system API as well as an embedded device API, and serves to effectively parse the device manifest files of a collection of package files. In general, the package information API provides the ability to enumerate the pre-existing packages on a device, to enumerate the shadow order information (described below) for a specific package, to enumerate the dependency information for a specific package, and to enumerate the list of file names of the files that belong to a specific package. The package information API also provides the ability to open a file that is stored in the file system as a device side manifest, open a device side manifest from within a specified package, and retrieve the package information (e.g., _PACKAGEINFO) for a specific package. The Package Information API also provides an interface to calculate a CRC32 value for a specific file, when given a path to that file, and to calculate a CRC32 value for a specific package, given a path to that package. The PackageInfoAPI component contains an implementation of the APIs set forth below.

The following API set defines the external interface to the PackageInfoAPI. The data types are described as follows:

HPKGENUM—This is an opaque data type that is used to identify a specific package enumeration set.

HPKG—This is an opaque data type used to represent a unique package.

HRESULT—This is a standard COM return type.

REFGUID—This is a reference to a GUID structure.

LPTSTR—This is a pointer to a TCHAR string

HFILEENTRY—This is an opaque data type that is used to pass FILEENTRY information to the calling program.

The following API finds the first valid (valid==not a malicious 'impersonator') package and supplies the handle needed to retrieve the package info:

```
HRESULT Pkg_FindFirstPackage(
    /* [out] */ HPKGENUM *phPkgEnum,
    /* [out] */ HPKG *phPkg);
```

The following API finds the next valid package and supplies the handle needed to retrieve the package info (S_FALSE indicates the end of the enumeration):

```
HRESULT Pkg_FindNextPackage(
    /* [in] */ HPKGENUM hPkgEnum,
    /* [out] */ HPKG *phPkg);
```

The following API closes the package enumerator:

HRESULT Pkg_FindClose(/* [in]*/ HPKGENUM hPkgEnum);

The following API will 'open' a Device Side Manifest file with specified GUID supplying the handle needed to retrieve the package info. This is an alternative to using the FindFirstPackage/FindNextPackage APIs:

```
HRESULT Pkg_OpenPackageByGUID(
    REFGUID guidPkg,,
    /* [out] */ HPKG *phPkg);
```

The following API will 'open' a Device Side Manifest file with specified name supplying the handle needed to retrieve the package info. This is an alternative to using the FindFirstPackage/FindNextPackage APIs:

```
HRESULT Pkg_OpenPackageByName(
    LPCTSTR szFileName, ,
    /* [out] */ HPKG *phPkg);
// 'close' the package (previously opened with
// Pkg_FindFirstPackage,
// Pkg_FindNextPackage or Pkg_OpenPackageByGUID)
HRESULT Pkg_Close(HPKG hPkg);
// Enumerate shadowed packages. S_FALSE indicates
// the end of the enumeration
HRESULT Pkg_GetNextShadowedPackage (HPKG hPkg, /*
[out] */ GUID *pguidShadowedPkg);
// Start enumeration of the GUID dependencies of the
// specified package.
HRESULT Pkg_GetFirstDependentPackage(
    HPKG hPkg,
    /* [out] */ GUID pguidDependentPkg,
    /* [out] */ DWORD*
pdwDependentPackageVersion );
// Continue the enumeration of GUID dependencies for
// the given package. S_FALSE indicates the end of
// the enumeration
HRESULT Pkg_GetNextDependentPackage(HPKG hPkg, /*
[out] */ GUID *pguidDependentPkg, /* [out] */ DWORD
*pdwDependentPackageVersion);
// Start enumeration of the files listed in the
// Package. If the buffer is not large
// enough (or is NULL), then cbSize will be set to
// the required size of the
// buffer, including the NUL character at the end.
HRESULT Pkg_GetFirstFile(
    HPKG hPkg,
    /* [out] */ LPTSTR pszFileName,
    /* [in/out] */ DWORD *cbSize );
// Enumerate files in the package. S_FALSE indicates
// the end of the enumeration.
HRESULT Pkg_GetNextFile(HPKG hPkg, /* [out] */
LPTSTR pszFilename, DWORD cbSize );
// Get the single-occurrence info for the package
HRESULT Pkg_GetPkgInfo(HPKG hPkg, /* [out] */
PPACKAGEINFO pPackageInfo);
// Maps the specified file as a DSM file. Returns
// E_FAIL if it is not a DSM.
HRESULT PkgInfo_OpenByName( LPCTSTR szFullName );
// Determine if a specific file is contained within
// the specified package.
// If the named file is part of the package,
HFILEENTRY will be non-NULL.
HRESULT Pkg_ContainsFile(
    HPKG hPkg,
    LPTSTR szFileName,
    /* [out] */ HFILEENTRY** pFileEntry );
// Validate the header for the specified Package.
HRESULT Pkg_ValidateHeader(
    HPKG hPkg,
    DWORD dwFileSize );
// Copies the CERT data from the specified Package
// into the passed in buffer.
// If the buffer is not large enough, or is NULL,
// then pcbBufferSize is set
// to the required size.
HRESULT Pkg_GetCERTData(
    HPKG hPkg,
    LPVOID lpBuffer,
    DWORD* pcbBufferSize );
// and the CRC calculation API (this will be used by
```

```
// test, for example, to verify against the CRC
// stored on the device)
HRESULT     Pkg_CalculateFileCRC(
    LPCTSTR pszFilename,
    /* [out] */ DWORD *pdwCRC);
HRESULT     Pkg_CalculatePackageCRC(
    LPCTSTR pszPackageName,
    /* [out] */ DWORD *pdwCRC);
// Opens the CAB, extracts the DSM and maps it.
// Returns E_FAIL if the file doesn't exit or isn't
a DSM.
HRESULT PkgInfo_ExtractFrom( LPCTSTR szCABFile );
// Given an HCAB returned by the CABAPI, finds the
// DSM, extracts it and maps it. Returns E_FAIL if
// the file doesn't exist or is not a DSM.
HRESULT PkgInfo_ExtractFromHCAB ( HCAB hCab );
```

Figure 3A:
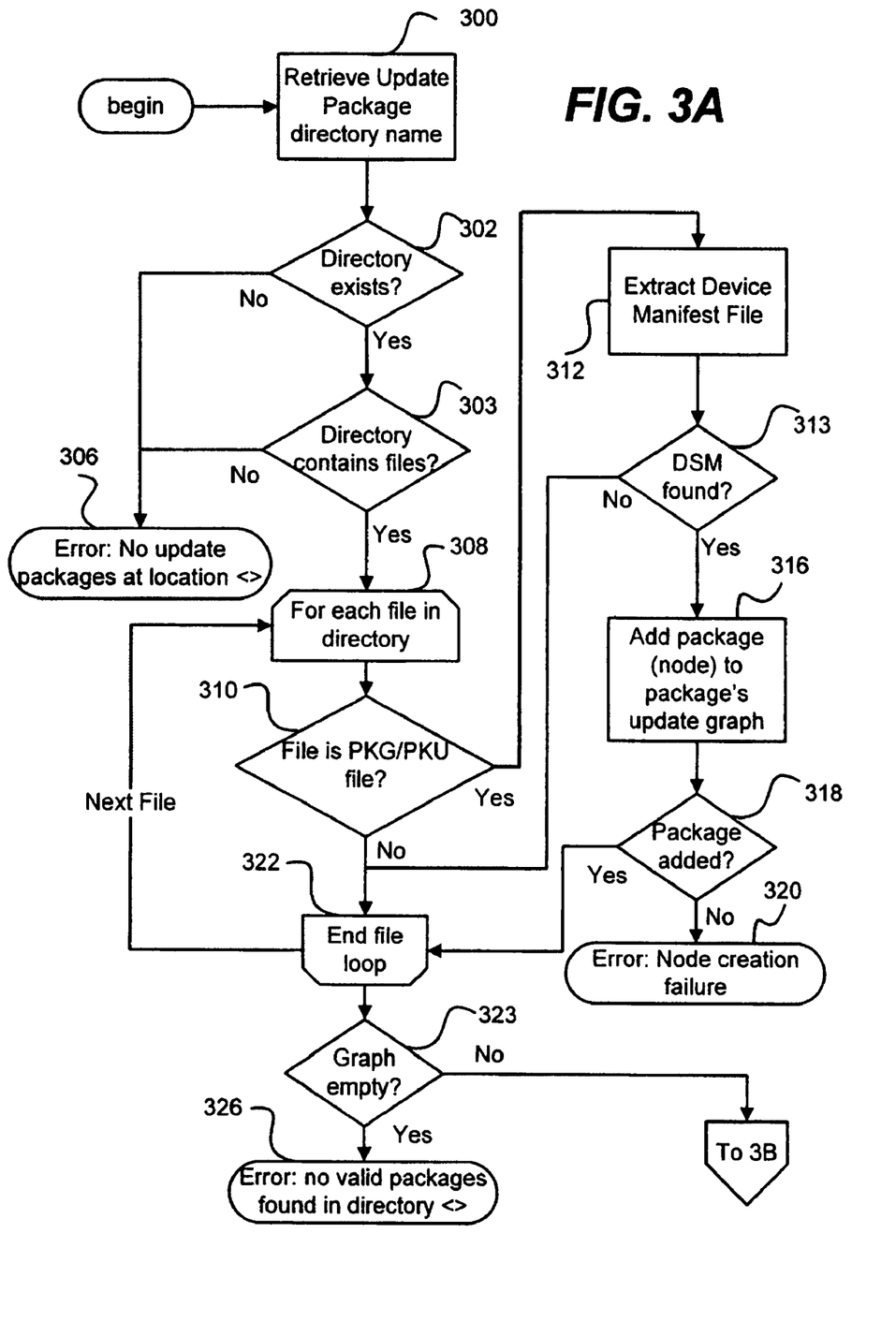
FIGS. 3A and 3B comprise a flow diagram for performing an update validation process, including handling dependency information in accordance with an aspect of the present invention.
Figure 3B:
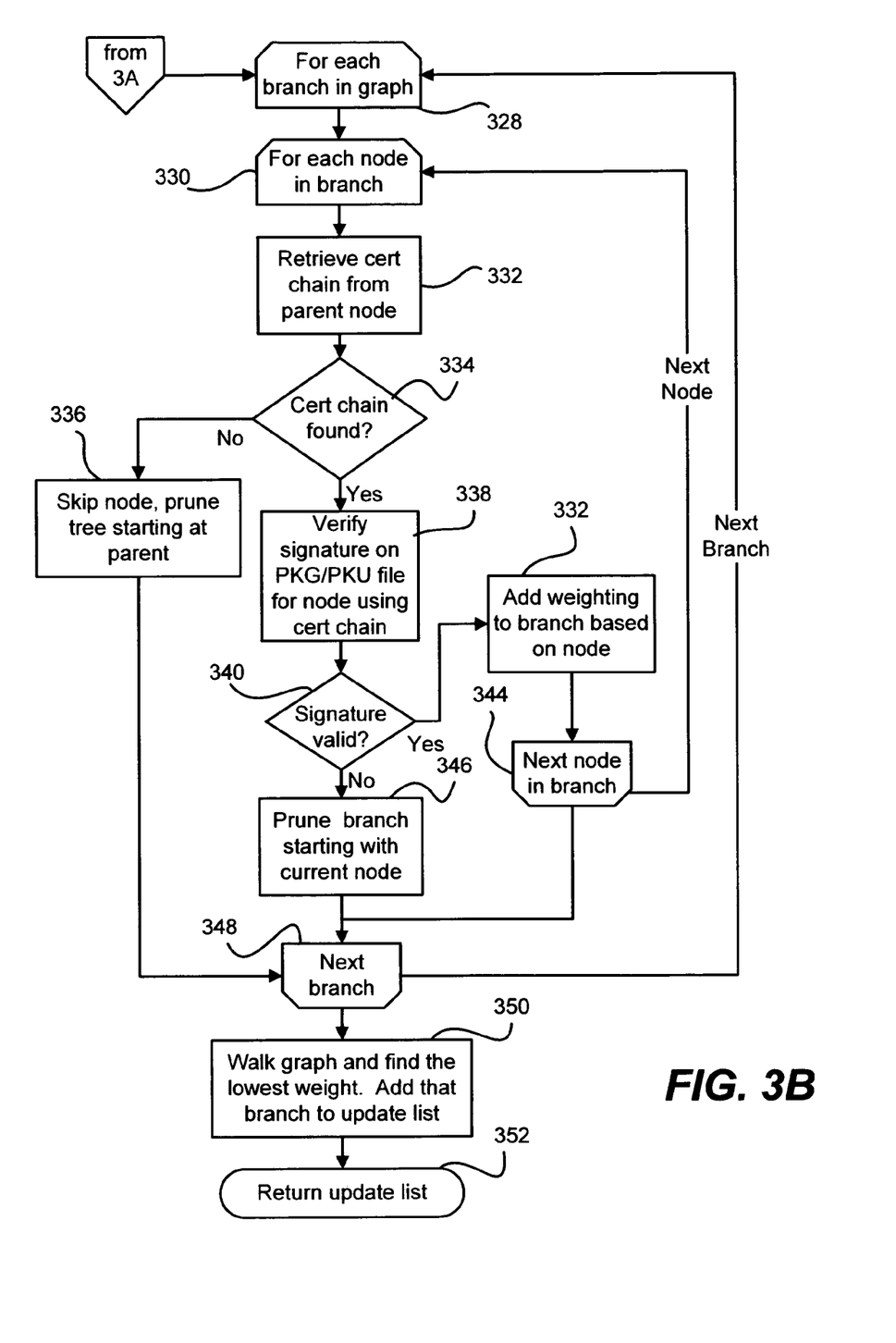

In accordance with an aspect of the present invention, any package to be installed is first validated. Package validation refers to a process in which the packages queued for install are reviewed for completeness, their contents are validated, update authority is determined (from a signature mechanism), and dependency relationships are determined. In one implementation, the result of the validation process comprises two lists: a list of one or more packages which can be installed because they pass the validation requirements, and a list of one or more packages which cannot be installed because they fail to meet one or more of the validation requirements, along with a failure reason for each. The lists may be sorted into an installation order, which, in addition to ensuring that any needed files will be present if deltas are applied, can depend on size considerations to reduce fragmentation and ensure there is enough space to do the update. FIGS. 3A and 3B comprise a flowchart describing the overall validation process.

In one implementation, the validation process is accessible as an application programming interface called, for example, by an update application. There are two functions, one called with the filenames of updates to validate and return installation data therefor, and another where the calling program provides a path to a directory where update packages are stored. For purposes of simplicity, the updates generally will be considered herein as being in a directory.

In FIGS. 3A and 3B, a number of tests are performed to determine whether a package can be installed, e.g., when given a directory containing one ore more packages to install. Step 300 takes the directory of packages, and tests determine whether the directory exists (step 302) and the directory contains file(s) (step 304). If not, an error message is returned via step 306 and the validation process ends.

If the directory exists with at least one file therein, steps 308 and 322 loop to iterate through each of the files, performing tests on each. Step 310 tests whether the file is a suitable type of package file; if so, step 312 attempts to extract the device-side manifest file (DSM) from the package. More particularly, in one implementation, a CABAPI is used to attempt to open the file as a CAB file. If this succeeds, then an attempt to extract the DSM is made. If the file cannot be loaded as a CAB file, the name is recorded into a list of bad packages with an HRESULT error code indicating that the specified file name could not be loaded as a CAB file. If the DSM cannot be extracted, then the name of the file is recorded in the list of bad packages with an HRESULT error code indicating that there was not a DSM in the CAB. If not a CAB file, or if the device manifest file is not found as evaluated at step 314, the next package file is selected and tested until none remain.

When a device-side manifest file is found, the package is added (e.g., as a representative node for that package) to a package graph via step 316. If not successful as tested by step 318, the validation process ends (at step 320) as a result of failing to create the node.

When each the files have been processed, the graph should not be empty if at least one file in the directory was a package file having a device manifest file. If the graph is empty (step 324), none of the files were valid packages, and the process ends at step 326. Otherwise the process continues to step 328 of FIG. 3B.

Step 328 (along with step 348) of FIG. 3B represent a loop for processing each branch in the graph, while step 330 (along with step 344) represent a nested loop for processing each node in the branch currently being processed. In general the processing looks for certificate information, including checking the parent node's certificate chain via steps 332 and 334, pruning the corresponding branch from the tree from the parent node when not found via step 336.

If found, the signature is verified via steps 338 and 340. If found, weighting data (that is used to evaluate efficiency when deciding which package to use relative to others when more than one path can be used to provide the same result) is added at step 342 to the branch based on the node, and the next node is selected until none remain via step 344. The weighting information is calculated when the package is loaded and is added to the weight of the path when the path is constructed. The initial graph construction works off of the assumption that the packages are valid, and thus the signature information only has to be verified for the packages that the process wants to use, rather than performing it on every package in the update set, which hopefully reduces the number of signature checks performed. If the signature is not valid at step 340, the branch is pruned from the current node at step 346.

When the branches and nodes of the graph have been processed in this manner, the graph is walked as represented by step 350 to find the lowest weighted branch, and that branch is added to the update list that is to be returned.

In accordance with an aspect of the present invention, the validation process provides the version-dependency calculation requirements that enable the determination of the maximal dependent software updates that are valid for installation. As represented by the block diagram of FIG. 4, the validation process 402 is associated with (or can be considered as including) various components to make the determination, including an update ordering component 404. The update ordering component 404 constructs a graph 406 of the set of packages that have been downloaded to a device as an update set 408, extracting the dependency information from the package manifest 410 and verifying that the other packages 412 are present on the device (or in the queued install packages 414) with the correct version. In addition, the update ordering component 404 is responsible for parsing the existing and new device manifest files 410 and 412 and generating an install order for the packages based on the dependency requirements.

Figure 5A:
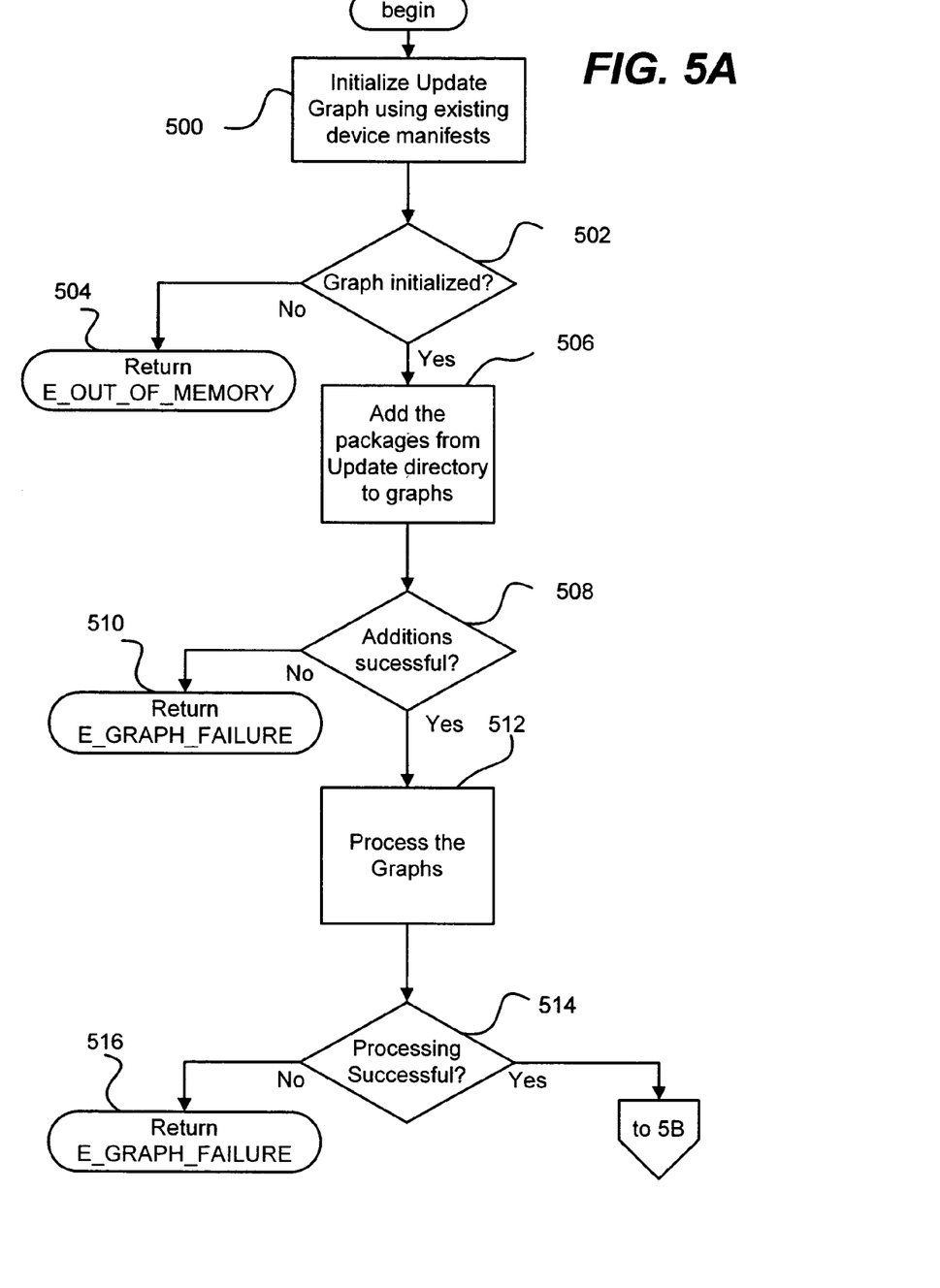
FIGS. 5A and 5B comprise a flow diagram for performing an update ordering process, including handling dependency information in accordance with an aspect of the present invention.
Figure 5B:
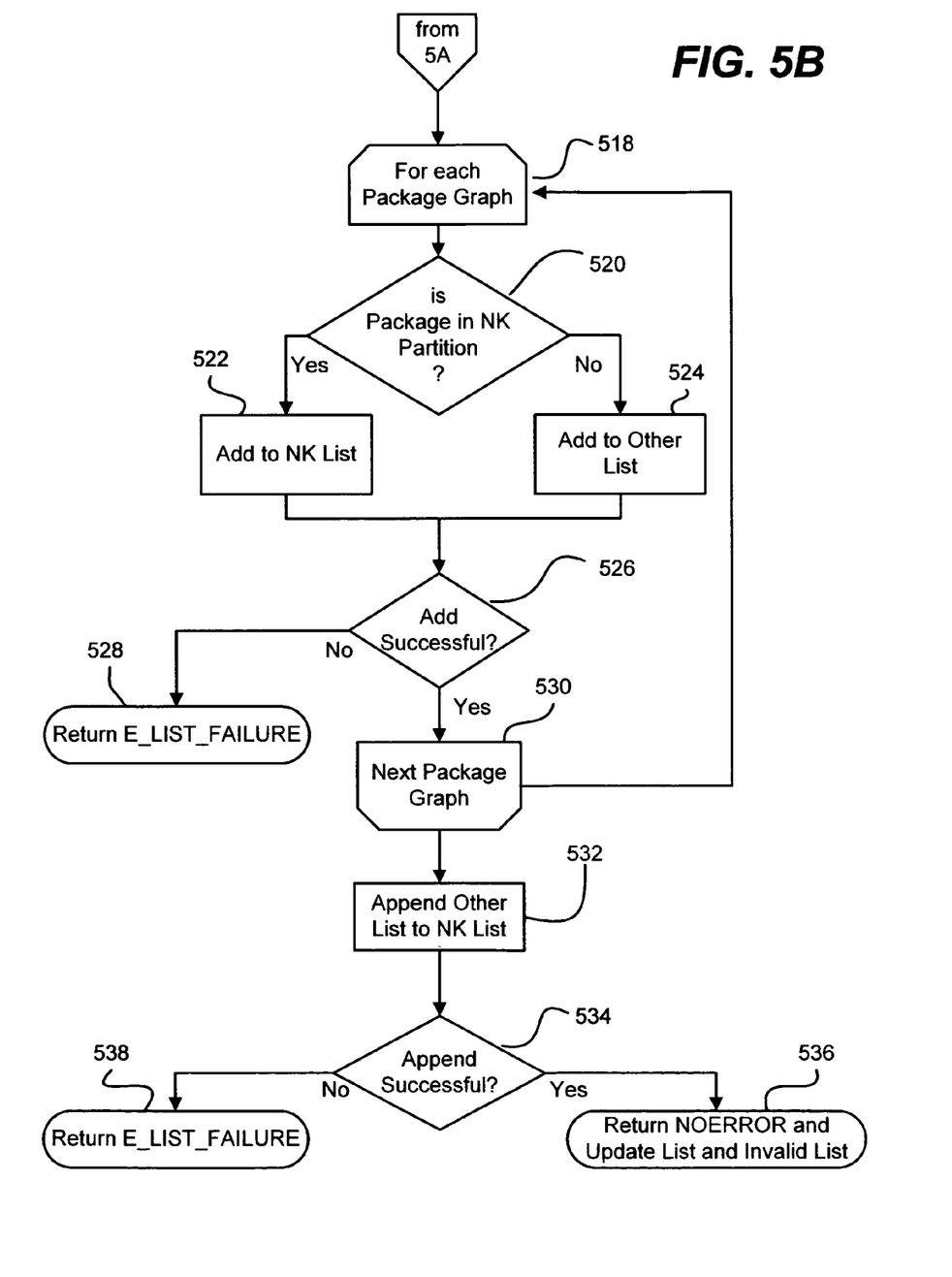

FIGS. 5A and 5B comprise a flowchart describing the update ordering process of the validation process. In general, after some initialization and validation checks (steps 500, 502 and 504), for each existing device manifest file on the device, which corresponds to a previously installed package, a package graph is created by the update ordering process to represent that package, as defined by the package's device manifest file which is maintained on the device. Note that the validation process may use the package information API to enumerate the existing device manifests. The packages in the update directory are added to the appropriate baseline graph for that package at step 506; if no existing graph is found, one is created for the new package, but tagged as a non-baseline graph. The node contains information based on the manifest and package, and when added, looks to the other nodes in the graph for version information to determine which node or nodes to connect to based on what version or versions the package can update. Note that there may be orphaned nodes in the graph that are capable of updating the packages that are being added to the graph. The graph construction process walks the nodes that comprise the graph and adds the appropriate links if there are existing nodes in the graph that can update the new node.

Once the packages to install have been added, each graph is walked, including for the purposes of evaluating paths and performing file validation. Note that the paths through the graph were constructed in real time as the nodes were added to the graph. As described below with reference to FIG. 6, once the packages have been loaded, the update validator walks each graph looking for the optimal path among the set of paths available for the graph. Once a path is selected for a graph, then the signatures for the nodes in the path are validated. If the signature for a specific node cannot be validated, then the path is pruned starting at the failing node, and then the path selection process is re-run for that graph. This process is repeated until either the nodes in a path are determined to have valid signatures or there are no more paths to process for the given graph.

Figure 4:
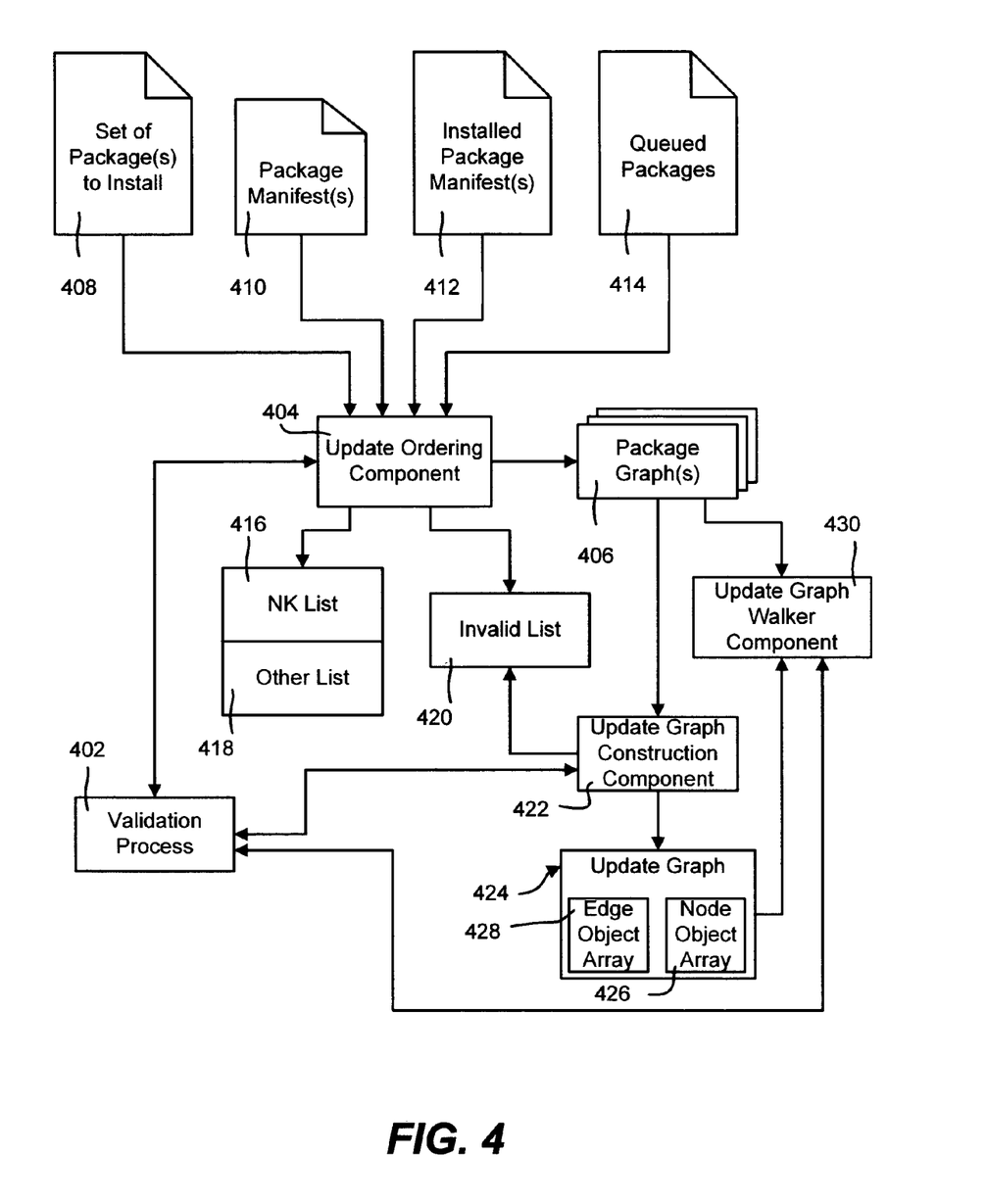
FIG. 4 is a block diagram showing various mechanisms that perform the update validation process in accordance with an aspect of the present invention.

If processing is successful at step 514, the update ordering process continues to step 518 of FIG. 5B, wherein for each resulting package graph, if the package is part of the NK partition, the Package information is added to NK list 416 (FIG. 4) via step 522. If the Package is not part of the NK partition, the package is added to an Other list 418 (FIG. 4). Once all Package Graphs have been processed, the other list 418 is appended to the NK list 416 via step 532, and if the append is successful as evaluated at step 534, a NOERROR state is returned with the appended NK list 416 and an invalid list 420.

Another part of the validation process 402 is directed to constructing an update graph, and is accomplished by an update graph component 422, which is responsible for building a graph of the packages that comprise an update on the device. Each preexisting package on the device will be used to create the base node for an independent graph. In one implementation, each package is represented by a package node object; note that in this implementation, each node object is contained within one, and only one, package graph object.

Figure 6:
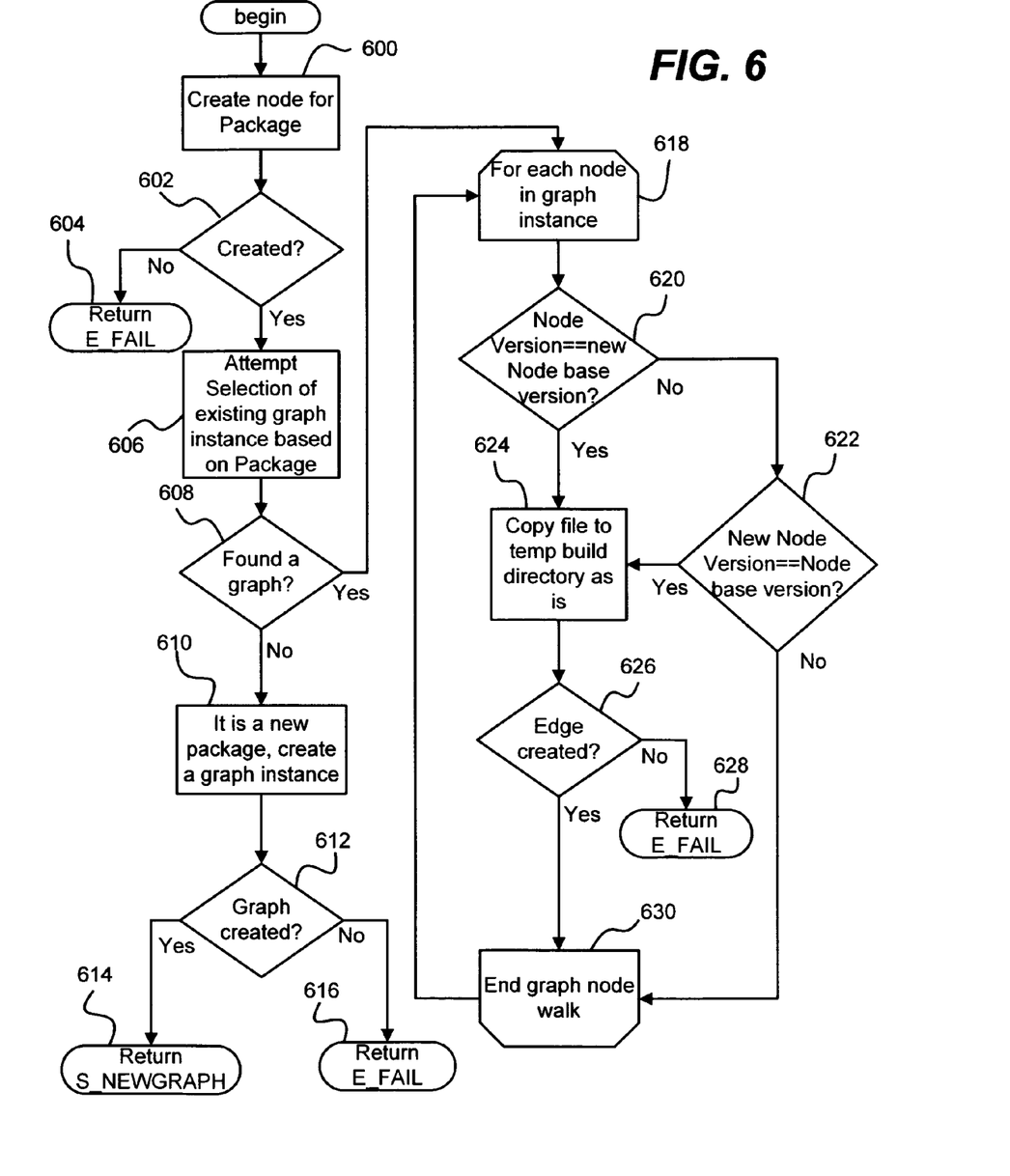
FIG. 6 is a flow diagram for constructing a graph to evaluate package dependencies in accordance with an aspect of the present invention.

The graph construction process is represented in FIG. 6. In general, the update graph 424 (FIG. 4) contains two arrays, including an array of node objects 436 and an array of edge objects 428. The edge objects connect nodes to each other. When a new package is added to the graph, a node object is created for the package and added to the node array 426, as represented by step 600. If the node is not created as evaluated at step 602, the process fails.

Steps 606 and 608 attempt to find an existing graph corresponding to this package; if none are found the package is new and a graph is created therefor at step 610, (and ensured that it is properly created via step 612). If successfully created, the new graph is returned at step 616, else a failure is returned.

If the node create was successful and a graph was found for that package, step 608 branches to step 618, where, via steps 618-630, for each node in the node array, if the base version of the new node matches the version number for the existing node, an edge object is created in the update graph 424 (FIG. 4) and added to the array 428. In this condition, the edge object specifies the existing node as the source and the new node as the sink. If instead the base version of the existing node matches the version number of the new node, an edge object is created specifying the new node as the source and the existing node as the sink.

Note that it is possible for a package to be added that, at the time of addition, has no connections to any existing nodes. This condition will be rectified through one of two outcomes, namely (a) there are no nodes that can be reached through this package node and there are no paths to this package node through other package nodes in the update; in this circumstance, the node will be marked as bad and will end up on the invalid update list, and (b) a package that will be added later will connect to the node. In this circumstance, the node will be processed during the graph walk phase, described below with reference to FIGS. 7A and 7B.

Further, note that if two packages have the same target version, then the two device-side manifest files are compared. If they are not equal, both nodes are marked as invalid, because for any given package, the device-side manifest file for a specific version should be the same across all packages that update the given package to a specific version.

As another part of the validation process, an update graph walker component 430 traverses each package graph in order to determine the highest final version number for the package based on possibly multiple paths through the graph. While walking, the update graph walker component 430 validates the digital signatures on the packages in the graph. If a signature check fails, the graph is pruned at that point and any the edges that connect to the failed node are removed.

Once the highest version number is determined, the dependencies for that node are validated. This is accomplished by querying the update graph 424 for a package graph that matches the dependent .GUID. If a new update graph has not been validated, then the update graph walker starts the walking process over on the new package graph. If a dependency cannot be satisfied, then the branch is abandoned and a new branch is attempted. The edges connecting the nodes in the branch are removed. If all possible branches are exhausted and the dependency requirements cannot be met, then the packages represented by the nodes in the graph are moved to the invalid update list.

Figure 7A:
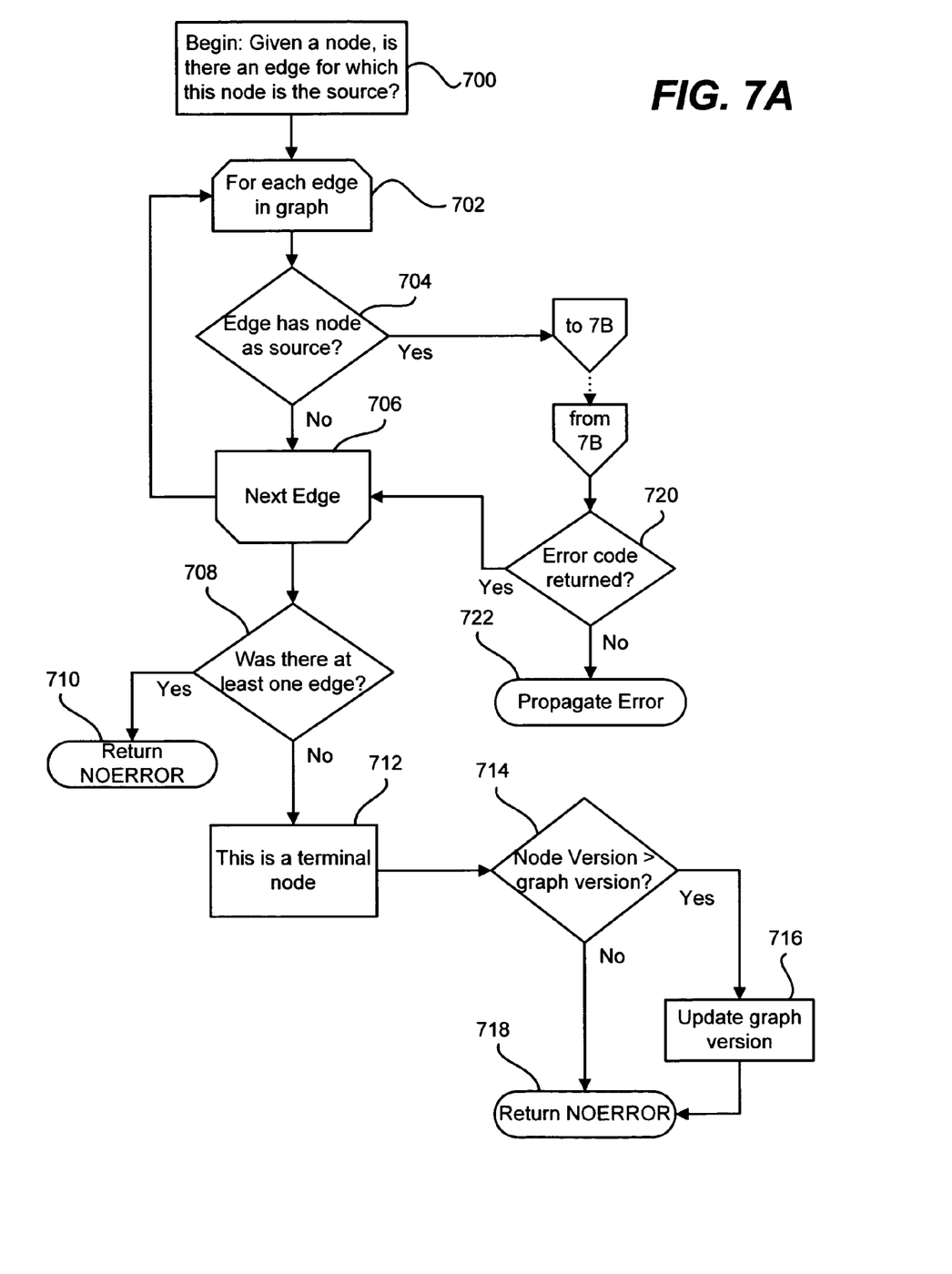
FIGS. 7A and 7B comprise a flow diagram for performing a traversal of a package update graph, in accordance with an aspect of the present invention.
Figure 7B:
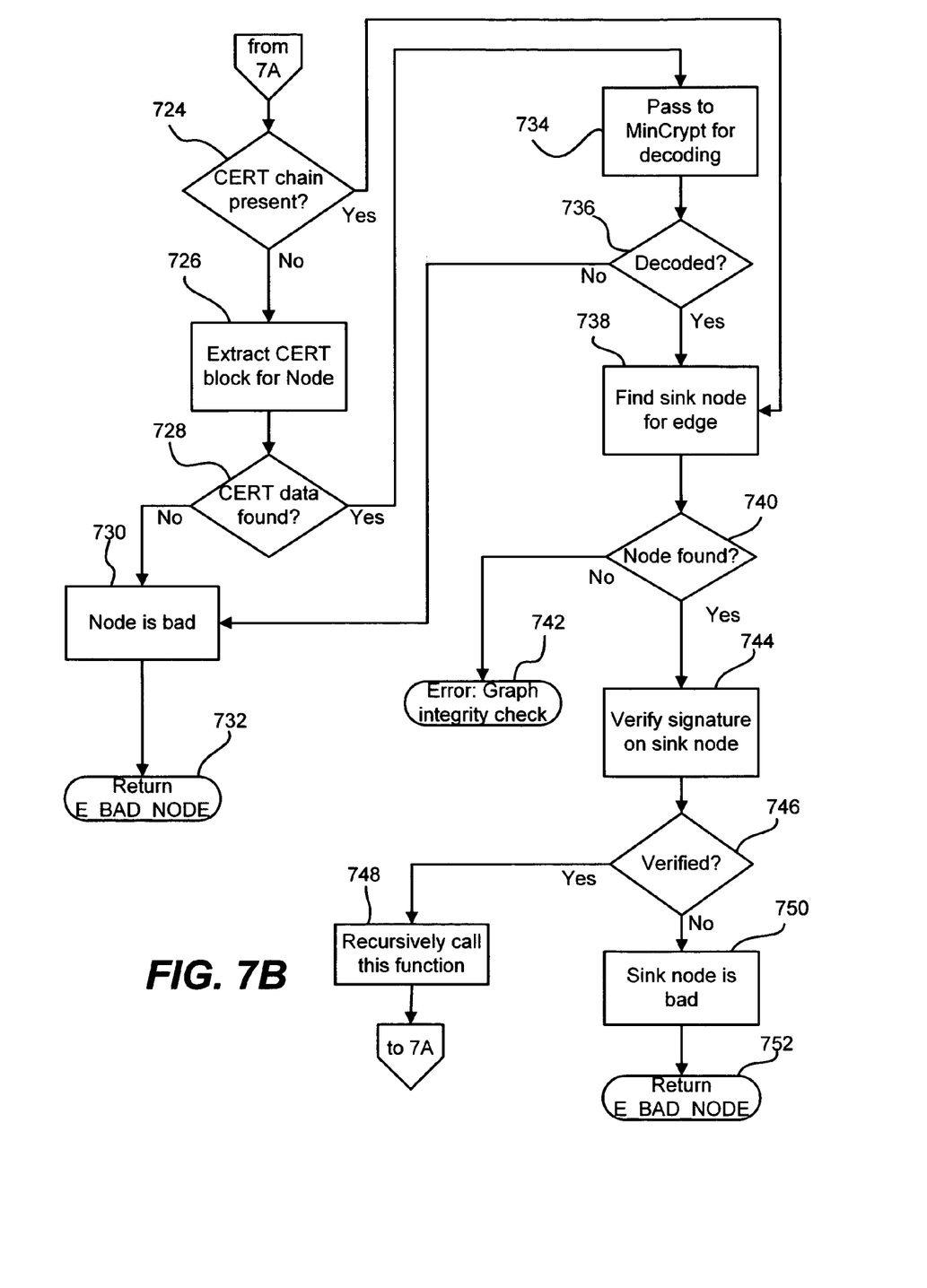

FIGS. 7A and 7B represent the logic of the traversal process, starting with base node for a graph. As represented by steps 702-706, for each edge in the graph, it is determined if the edge has the node as the source (step 704). If there are no edges associated with the node, then a terminal node has been detected, and is handled by steps 708-718. In general, these steps compare the version number for the node with the graph version number (step 714), and if the node version is higher than the graph version, the graph version is updated to the node version at step 716, and the process ends (with no error returned).

If instead there was an edge at step 704, the process branches to step 724 of FIG. 7B to check the node to see if it has a CERT chain. If there is no CERT chain at step 724, the CERT block is obtained from the device-side manifest file corresponding to the node. Note that if there is no CERT block in the device-side manifest file, the node is marked as bad at step 730 and the process returns.

If there is CERT data at step 724 or step 728, the process proceeds to step 734 to decode the data. If the decoding fails, the node is marked as bad at step 730 and the process returns.

Otherwise, an attempt to find the sink node at the end of the edge is performed at step 738, with a test at step 740 as to whether there is no sink node; if not, a graph integrity error is logged and the process returns via step 742.

If the sink node is found, the CERT data is used to validate the sink node (step 744). If the sink node passes signature validation, then this function is recursively called, passing the sink node at step 748, returning to step 720 of FIG. 7A. If the sink node fails, then the edge is marked as bad.

In this manner, the maximal set of updates is determined and returned in an ordered update list, along with a list of any invalid updates. This may correspond to the minimal number of packages that maximize the device package versions.

As can be seen from the foregoing detailed description, there is provided a mechanism that handles device updates on the device side. The mechanism deals with the many update versions and conflicts and dependencies between those versions to provide a minimal number of valid packages when applied will maximize the device package versions.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing system having an operating system installed, the operating system being divided into a plurality of discrete packages, and wherein a plurality of version updates are available to update a first package of the installed operating system, a method for selecting an optimal set of available versions to allow for maximal version updates of the first package in the fewest update steps possible, while honoring package dependency constraints, the method comprising:

downloading, to a mobile computing device, a collection of update packages for updating an operating system that is installed on the mobile computing device, wherein the operating system is divided into a plurality of discrete packages that may each be updated independently from the other packages, and wherein the collection of update packages includes a plurality of update packages that correspond to different versions of the installed first package of the installed operating system on the mobile computing device, and wherein each update package includes an associated manifest file that describes the contents and related dependency information of the update package, including the version of the update package;

for each package of the installed operating system on the mobile computing device, generating a graph having a node for the installed version of the package, the graph being generated from a manifest file corresponding to the installed version of the package;

for each of the update packages to be installed, accessing the associated manifest file to determine on which installed package the update package depends, wherein each update package may depend on an installed package by being directly dependent on the installed package or by being recursively dependent on another update package which in turn is dependent either directly on the installed package or on another update package, and upon determining on which installed package the update package depends, adding a new node to the graph, the new node corresponding to the version of the update package, such that upon adding a new node for each of the update packages, each graph is formed as a tree having the node for the installed version at the base of the graph and branches for each of the new nodes, each new node being linked to another node on which it depends, and each new node of the same graph corresponding to a different version of the installed package that the graph represents;

subsequent to generating the graphs, determining that the graph corresponding to the first package of the installed operating system includes two paths that each include a node corresponding to the highest final version to which the first package may be updated;

subsequent to identifying the two paths, traversing each path and validating each node traversed;

upon validating each node of both paths, selecting the path that has the lowest cost of installation wherein each version in a path has a cost of installation and wherein the cost of installation of each path comprises the sum of the cost of installation of each version in the path; and installing the update package corresponding to each node of the selected path to update the first package of the installed operating system.

2. The method of claim 1 further comprising organizing the collection of update packages into coherent groups based on the currently installed package on the mobile computing device targeted by each update package.

3. The method of claim 1 wherein the path having the fewest nodes the path having the fewest nodes is selected.

4. The method of claim 1 wherein validating each node comprises accessing a file associated with the update package corresponding to the node to determine whether the file is a suitable type of package file.

5. The method of claim 1 wherein validating each node comprises determining whether the update package corresponding to the node contains an associated manifest file that describes the update package contents.

6. The method of claim 1, further comprising determining that none of the generated graphs correspond to the update package, and in response, generating a new graph, and adding a node corresponding to the version of the update package to the new graph.

7. The method of claim 1 wherein validating each node traversed comprises determining whether a certificate chain is associated with the given node via a parent node.

8. The method of claim 7 wherein a certificate chain is associated with the given node, and wherein validating each node traversed comprises verifying whether the package corresponding to the node contains a valid signature.

9. The method of claim 8 wherein the signature is valid for the given node, and further comprising, adding weighting data to the path based on that node.

10. The method of claim 9 further comprising, traversing the package graph to find a lowest weighted path, and adding information corresponding to that path to an update list.

11. The method of claim 7 wherein at least one node remains in the graph and wherein at least one remaining node is in a path having an associated weight value, and further comprising, traversing the graph to find a lowest weighted path, and adding information corresponding to that path to an update list.

12. The method of claim 1 wherein selecting each version for installation comprises determining a partition corresponding to each version, and sorting each version into lists by adding each version to a respective list based on the corresponding partition for that version.

13. One or more computer-readable storage media storing computer-executable instructions which when executed perform the method of claim 1.

14. The computer-readable storage media of claim 13 wherein validating each node comprises accessing a file associated with the update package corresponding to the node to determine whether the file is a suitable type of package file.

15. The computer-readable storage media of claim 13 wherein validating each node comprises determining whether the update package corresponding to the node contains an associated manifest file that describes the update package contents.

* * * * *